United States Patent
Reed et al.

(10) Patent No.: US 10,640,239 B2
(45) Date of Patent: May 5, 2020

(54) SPACE DEBRIS INTERCEPTION

(71) Applicant: AIRBUS DEFENCE AND SPACE LIMITED, Stevenage, Hertfordshire (GB)

(72) Inventors: Jaime Reed, Stevenage (GB); Simon Barraclough, Stevenage (GB); Andrew Ratcliffe, Stevenage (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 277 days.

(21) Appl. No.: 15/518,072

(22) PCT Filed: Oct. 30, 2015

(86) PCT No.: PCT/EP2015/075335
§ 371 (c)(1),
(2) Date: Apr. 10, 2017

(87) PCT Pub. No.: WO2016/066837
PCT Pub. Date: May 6, 2016

(65) Prior Publication Data
US 2017/0313447 A1    Nov. 2, 2017

(30) Foreign Application Priority Data
Oct. 30, 2014  (EP) .................................... 14275222

(51) Int. Cl.
*B64G 1/64*   (2006.01)
*B64G 1/24*   (2006.01)
(Continued)

(52) U.S. Cl.
CPC ............. *B64G 1/646* (2013.01); *B64G 1/242* (2013.01); *B64G 1/62* (2013.01); *B64G 3/00* (2013.01); *B64G 1/007* (2013.01)

(58) Field of Classification Search
CPC .......... B64G 1/007; B64G 1/24; B64G 1/222; B64G 1/242; B64G 1/62; B64G 1/646;
(Continued)

(56) References Cited

U.S. PATENT DOCUMENTS 5,082,211 A * 1/1992 Werka .................... B64G 1/242
                                                            244/158.2
5,421,540 A * 6/1995 Ting ..................... B64G 1/1078
                                                            244/158.1
(Continued)

FOREIGN PATENT DOCUMENTS

EP        2774855 A1    9/2014

OTHER PUBLICATIONS

Extended European Search Report, European patent application No. 14275222.9, dated May 15, 2015.
(Continued)

*Primary Examiner* — Claude J Brown
(74) *Attorney, Agent, or Firm* — Marshall, Gerstein & Borun LLP

(57) ABSTRACT

A vehicle for intercepting a target object orbiting in space is provided, comprising a launching portion for driving the vehicle into an orbit, and an interception portion for intercepting a target object when the vehicle is in orbit, wherein the interception portion comprises means for engaging with the target object and wherein the launching portion is arranged to drive the vehicle into a first elliptical orbit and the vehicle is arranged to adopt a second elliptical orbit when engaged with the target object in which the first elliptical orbit is arranged so as to intersect the orbit of the target object at an interception point, and the second elliptical orbit is such that the vehicle is arranged to move from the interception point towards the Earth's atmosphere when engaged with the target object. A method of controlling a (Continued)

vehicle for intercepting a target object orbiting in space is also provided, comprising controlling the vehicle to be driven into a first elliptical orbit to intersect the orbit of the target object at an interception point and controlling the vehicle to engage with the target object at the interception point and to adopt a second elliptical orbit when engaged with the target object in which the second elliptical orbit is such that the vehicle is arranged to move from the interception point towards the Earth's atmosphere when engaged with the target object.

20 Claims, 11 Drawing Sheets

(51) Int. Cl.
  *B64G 1/62* (2006.01)
  *B64G 3/00* (2006.01)
  *B64G 1/00* (2006.01)

(58) Field of Classification Search
  CPC ........ B64G 1/648; B64G 3/00; G05D 1/0005; G05D 1/0094; G05D 1/0883
  USPC ...................................... 244/158.5
  See application file for complete search history.

(56) References Cited

U.S. PATENT DOCUMENTS

| | | | |
|---|---|---|---|
| 6,626,077 | B1 | 9/2003 | Gilbert |
| 6,655,637 | B1* | 12/2003 | Robinson ............... B64G 1/007 |
| | | | 244/172.4 |
| 7,207,525 | B2* | 4/2007 | Bischof .................... B25J 15/10 |
| | | | 244/158.2 |
| 8,496,208 | B1* | 7/2013 | Stone ................... B64G 1/1078 |
| | | | 244/171.1 |
| 9,434,485 | B1* | 9/2016 | Lehocki .................... B64G 1/22 |
| 9,944,412 | B2* | 4/2018 | Szabo ................... B64G 1/1078 |
| 2010/0193640 | A1* | 8/2010 | Atmur .................... B64G 1/242 |
| | | | 244/158.2 |
| 2011/0139936 | A1* | 6/2011 | Allen ................... B64G 1/1078 |
| | | | 244/158.2 |
| 2011/0273329 | A1* | 11/2011 | Weng ..................... G01S 19/27 |
| | | | 342/357.31 |
| 2013/0075534 | A1 | 3/2013 | Taylor et al. |
| 2013/0175401 | A1* | 7/2013 | Starke ................. B64G 1/1078 |
| | | | 244/171.1 |
| 2014/0107865 | A1 | 4/2014 | Griffith, Sr. et al. |

OTHER PUBLICATIONS

International Search Report and Written Opinion, International Application No. PCT/EP2015/075335, dated Jan. 11, 2016.

* cited by examiner

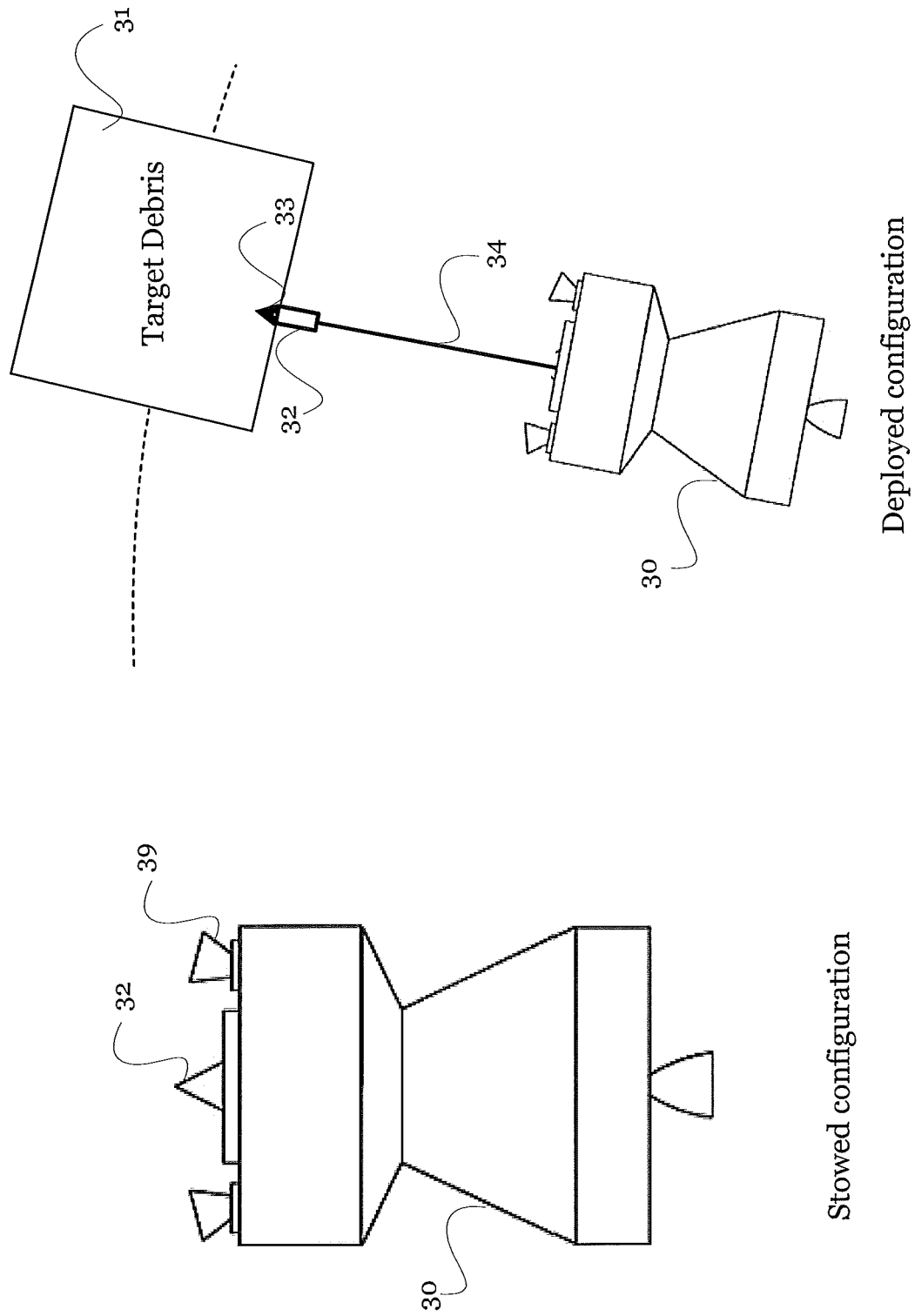

Deployed configuration

Stowed configuration

SPACE DEBRIS INTERCEPTION

CROSS-REFERENCE TO RELATED APPLICATIONS

This is the U.S. national phase of International Application No. PCT/EP2015/075335, filed Oct. 30, 2015, which claims the benefit of European Patent Application No. 14275222.9, filed Oct. 30, 2014.

TECHNICAL FIELD

The present invention relates to the interception of a target object orbiting in space. Particularly, but not exclusively, the present invention relates to the capture of space debris and its transfer to the Earth's atmosphere using an interception vehicle.

BACKGROUND ART

There is considerable concern about the amount of space debris in orbit around the Earth. Even very small debris objects can cause significant damage to other objects in space as relative velocities in orbit can reach many kilometres per second. Some of the space debris orbiting the Earth includes large objects, ranging from inactive satellites to expended rocket booster stages. Objects such as those mentioned can cause serious damage to a spacecraft on collision and be a plentiful source of further smaller debris fragments in the event of a collision with a space vehicle or other debris objects. The amount of space debris already in orbit is thought to pose a threat to the continued use of certain orbital bands, such as those within the Low Earth Orbit (LEO) range used for communication satellites.

Numerous studies have been carried out into the problem of space debris. The main features of these proposals are:
- a "chaser" or "servicer" which rendezvous with the target item of space debris;
- a docking or capture manoeuvre, followed by a stabilization manoeuvre; and
- a de-orbit manoeuvre.

Such "active debris removal" (ADR) configurations therefore retrieve objects from an orbit using a chaser or service vehicle (typically comprising at least a capture device, propulsion system, and navigation system) which then manipulates the retrieved objects so that they deorbit, for example by burning up in the Earth's atmosphere. To save costs the chaser or service vehicle would be kept in orbit for future missions, however, which therefore makes the deorbit process complex.

These configurations make use of a satellite which hosts the chaser or servicer components. As such, a satellite launch is required before the chaser or servicer components can be deployed. Such missions have proven to cost of the order of several hundred million euros. The required power and fuel consumption for the satellite launch and repeated docking or de-orbit manoeuvres are significant components of the mission costs, together with operation costs. In addition the technical complexity associated with effective docking routines and de-orbit manoeuvres have led to alternative solutions being sought.

One alternative solution proposed in the literature is to use chemical thrusters to provide a braking force to the target, so as to reduce the potential for debris to continue to cause damage via high-velocity collisions. However, these techniques would be extremely problematic due to the high heating from bi-propellant or mono-propellant systems which could melt the target. Cold gas would also be very mass-inefficient. In addition the stand-off distance would be only a few metres which would lead to a high risk of collision between the target and the service vehicle. Therefore such a technique might only be useful for small items of debris. Electric thrusters are an alternative to chemical thrusters, although these are also likely to be expensive.

Another proven solution is the destruction of space debris with a ground-launched missile, rather than its capture. While this technique is simpler, it generally leads to an increase in smaller space debris, particularly following the destruction of large objects at an altitude of over 600 km, and so in some circumstances, this approach may actually worsen the space debris problem.

The present invention aims to provide a non-destructive capture and deorbit technique which is much more cost-efficient than those currently used. The present invention eliminates the use of a host satellite and uses a dedicated launch system as the debris interceptor, configured so as to intercept a target object, rather than destroy it. This configuration leads to a significant cost reduction, and the possibility of multiple active debris removal missions using different launcher/interceptor vehicles.

SUMMARY OF INVENTION

According to an aspect of the present invention, there is provided a vehicle for intercepting a target object orbiting in space, comprising a launching portion for driving the vehicle into an orbit and an interception portion for intercepting a target object when the vehicle is in orbit, wherein the interception portion comprises means for engaging with the target object and wherein the launching portion is arranged to drive the vehicle into a first elliptical orbit and the vehicle is arranged to adopt a second elliptical orbit on engagement with the target object in which the first elliptical orbit is arranged so as to intersect the orbit of the target object at an interception point, and the second elliptical orbit is such that the vehicle is arranged to move from the interception point towards the Earth's atmosphere when engaged with the target object.

The interception portion may comprise means for tracking the target object, wherein the tracking means may comprise one or more of an optical sensor, an infra-red sensor and radar.

The vehicle may further comprise means for controlling the movement of the vehicle in the first and/or second elliptical orbits.

The means for controlling movement of the vehicle may be arranged to receive feedback from the tracking means and to impart corrective motion to the vehicle.

The means for controlling movement of the vehicle may comprise one or more thrusters controlled by a control means in the interception portion.

The first and second elliptical orbits may be such that the transition from the first elliptical orbit to the second elliptical orbit is that which requires minimum operation of the means for controlling movement of the vehicle.

The trajectories of the first and second elliptical orbits may be predetermined and stored in a memory in the vehicle.

The interception portion may comprise a controller for calculating the second elliptical orbit based on information relating to the target object.

The vehicle may comprise communication means for communicating with a ground station in order to receive trajectory information defining the first and second elliptical orbits.

The engaging means may comprise at least one of a harpoon, a net or one or more airbags. An alternative option could be a device comprising a collection of spikes, such as a grappling hook, which take advantage of the relative motion between the interceptor and the debris to provide engagement and capture.

The engagement means may be arranged to cause the interception portion to combine with the target to form a composite body, or to tow the target in the second elliptical orbit.

The vehicle may further comprise retardation means for slowing the vehicle from the first elliptical orbit to a lower second elliptical orbit on or after engaging the target object.

According to another aspect of the present invention, there is provided a method of controlling a vehicle for intercepting a target object orbiting in space, comprising controlling the vehicle to be driven into a first elliptical orbit to intersect the orbit of the target object at an interception point, and controlling the vehicle to engage with the target object at the interception point and to adopt a second elliptical orbit on engagement with the target object, in which the second elliptical orbit is such that the vehicle is arranged to move from the interception point towards the Earth's atmosphere when engaged with the target object.

The method may comprise tracking the target object in order to determine the closing velocity of the vehicle with respect to the target object at the interception point, wherein the closing velocity may be so as to enable engagement of the vehicle with the target object, and to enable transition from the first elliptical orbit to the second elliptical orbit with minimum corrective control of the movement of the vehicle.

The method may comprise tracking the vehicle when engaged with the target object and controlling the second elliptical orbit such that the vehicle enters the Earth's atmosphere at a predetermined location.

The propellant needed for the interceptor is significantly reduced compared with the conventional techniques described above, because the interception is based on an appropriate selection of a launch trajectory, interception point and deorbit trajectory, rather than on manoeuvres of a satellite in space to achieve the required interception.

In addition, the interceptor can be configured to engage the target object so as to form a composite structure which moves to a lower elliptical orbit than the initial state of the target object. Such a lower orbit can pass into the Earth's atmosphere where the target object burns up, together with the interceptor. The interceptor can thus be configured for a single-use mission, meaning that low propellant is required, reducing costs. In turn, the invention enables the removal of space debris from orbit in a manner which does not generate new smaller debris objects, providing an improvement over destructive-based techniques.

BRIEF DESCRIPTION OF DRAWINGS

Embodiments of the present invention will now be described by way of example only, with reference to the accompanying drawings, in which:

FIG. 3a illustrates a harpoon used in the interception vehicle of an embodiment of the present invention;

It will be appreciated that for convenience of explanation, some elements of the drawings are not shown to scale.

DESCRIPTION OF PREFERRED EMBODIMENTS

Figure 1:
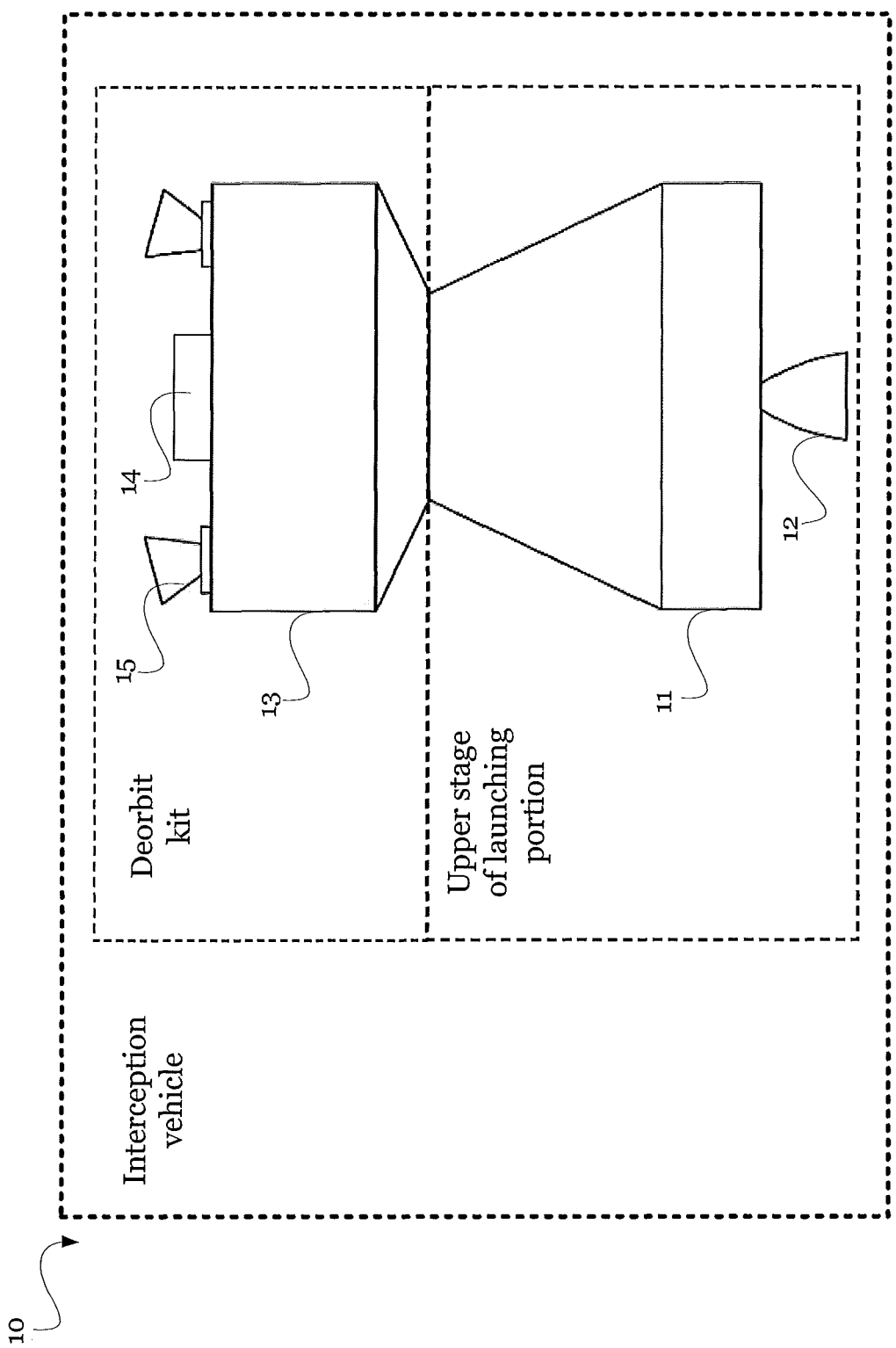
FIG. 1 shows an example interception vehicle according to an embodiment of the present invention.

FIG. 1 shows an interception vehicle 10 according to an embodiment of the present invention. The interception vehicle 10 will be referred to as a "vehicle" hereinafter for simplicity, but may also be referred to as a "chase vehicle", "chaser", or "service vehicle".

Figure 3B:
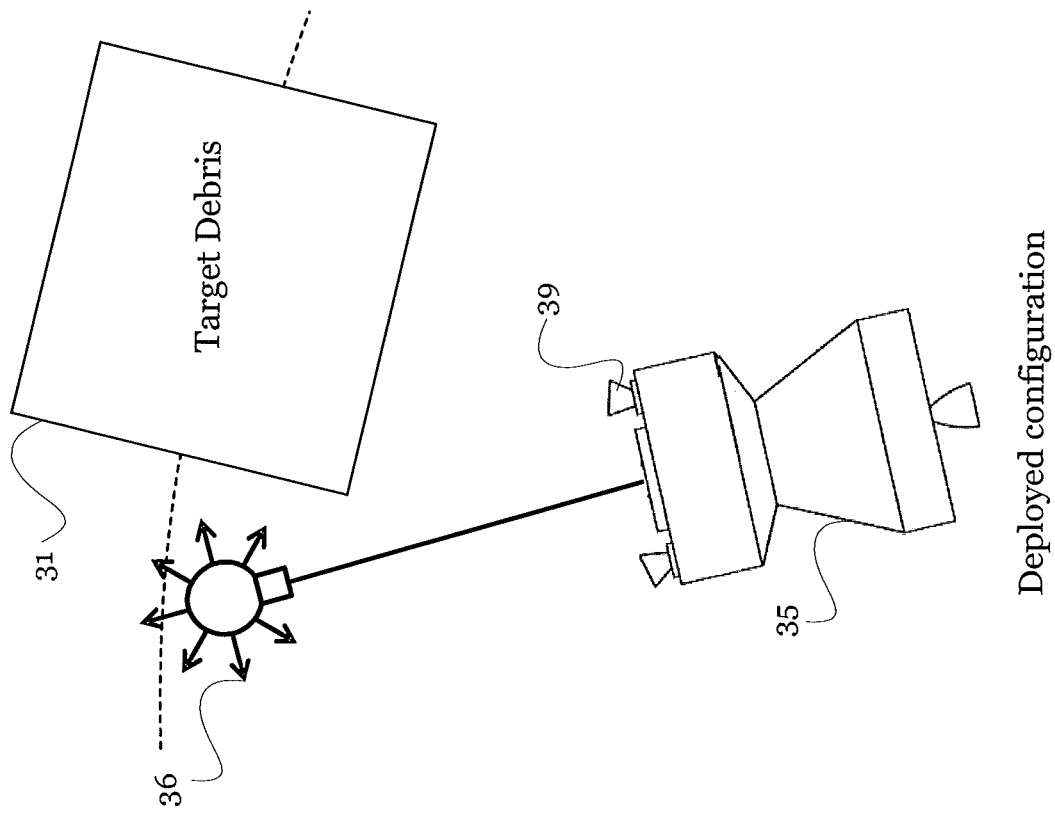
FIG. 3b illustrates a passive grappling device used in the interception vehicle of an embodiment of the present invention.
Figure 3B:
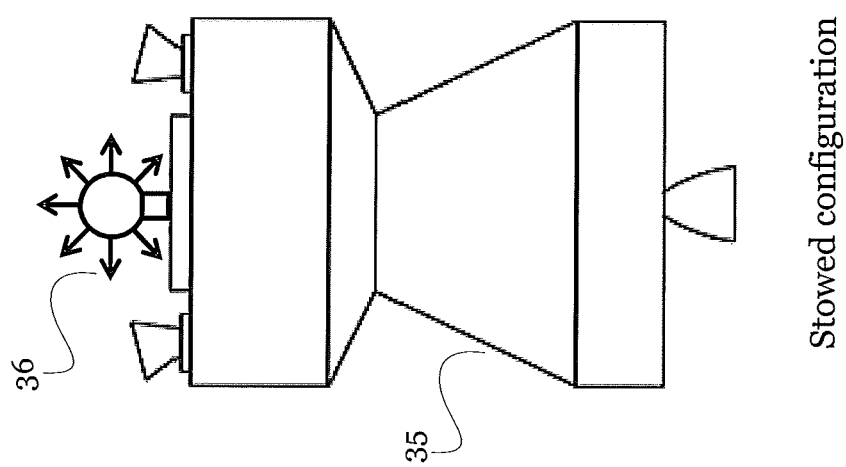
Figure 3C:
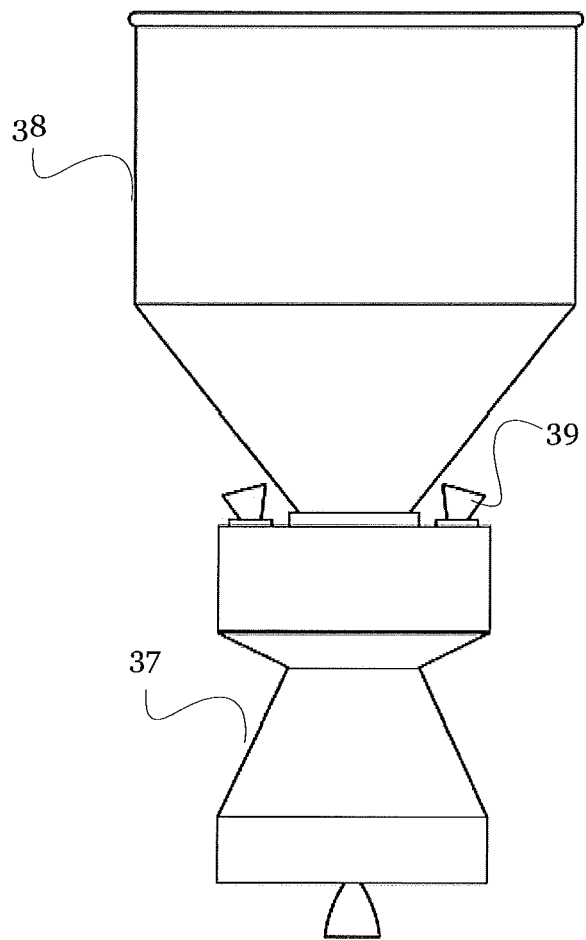
FIG. 3c illustrates the configuration of an air bag used in the interception vehicle of an embodiment of the present invention.

The vehicle 10 has two main components—an upper stage 11 of a launching portion and an interception portion 13 or "deorbit kit" to be described in greater detail with respect to FIGS. 3a, 3b and 3c. The launching portion contains fuel required to launch the vehicle 10 into space, and operates on similar principles to those used in the launch of other spacecraft. As such, the launching portion may be separable from the interception portion 13, which continues in a particular orbit once the launching portion is discarded. The launching portion may itself be formed of multiple stages, each of which separates from the vehicle 10 in turn at predetermined points along the launch trajectory. The release mechanism for each stage can be programmed automatically, dependent on the consumption of fuel in the respective stage, and the skilled person would understand that a number of specific configurations would be possible which would be capable of launching the vehicle 10 into a predetermined orbit. In another embodiment, the launching portion and the interception portion 13 are integrally combined, and no separation takes place during launch. In the example shown in FIG. 1, the upper stage 11 is shown as remaining in connection with the interception portion 13 of the vehicle 10 once the lower stages of the launching portion have been removed, and contains a thruster 12 for manoeuvring the vehicle 10 in space. The upper stage may itself be involved in the launch phase, and the thruster 12 can be interpreted as a generalisation of the control mechanism which enables the vehicle 10 to travel to what is referred to as a "first elliptical orbit" in the description below.

The interception portion 13 is arranged to engage with a target object of space debris, and to move the target object to a lower orbit from that which the vehicle 10 adopts prior to engagement. When engaged with the target object, the vehicle 10 brings the target object into an orbit such that it can burn up in the Earth's atmosphere in a predetermined location.

In order to enable engagement, the interception portion contains an engagement means 14, to be described in more detail below. The engagement means 14 is responsible for making contact with the target object, and capturing it such that the interception portion 13 and target object combined as a composite object which burns up in the Earth's atmosphere.

The vehicle 10 comprises means 15 for communicating with a ground station. Such means are used in order to feed back progress and diagnostic information to the ground station, and to receive control signals from the ground station. In one embodiment, the information fed to the ground station, via a satellite link includes data reporting the position, and/or velocity and/or acceleration of the vehicle 10, and information relating to tracking of the target object, performed by sensors on the vehicle. Such tracking sensors may be optical, infra-red, radar, or a combination of all three. The information received from the ground station relates to control of motion actuators on the interception portion which is required in order to ensure that a predetermined orbit is adopted. In addition, control of the engagement means 14 is provided via a ground station control signal, such as launch of a harpoon, or activation of air bags, to be described in more detail below.

In another embodiment, the level of control signals which are required to be received from the ground station is reduced, and on-board control can be performed by a control unit on the vehicle 10. The control unit interfaces with motion actuation means, tracking sensors, and controls the engagement means 14. However, since the vehicle is intended to burn up in the Earth's atmosphere with the retrieved target object, the vehicle is intended to be designed to be relatively simple, and so moving as much of the processing to the ground station ensures that a control unit required to process the control signals at the vehicle can be designed as simply as possible.

The vehicle 10 contains a memory for storing a pre-programmed itinerary, in terms of a first elliptical orbit in which the vehicle 10 is to travel in space prior to interception of a target object, and a second elliptical orbit in which the vehicle 10 is to travel in space after interception of the target object. The storage of the itinerary ensures that the vehicle 10 is able to apply auto-correction, or to receive correction signals from a ground station, such that the first and second elliptical orbits are maintained. The first and second elliptical orbits are described in more detail below.

The launching portion is controlled to take the vehicle 10 from Earth into the first elliptical orbit. Such control is achieved using appropriate selection of a launch velocity and launch timing, such that the vehicle 10 reaches a predetermined interception point, where interception of the target is to be performed, at a predetermined time. This process will be described in more detail with respect to FIGS. 2a and 2b.

Figure 2A:
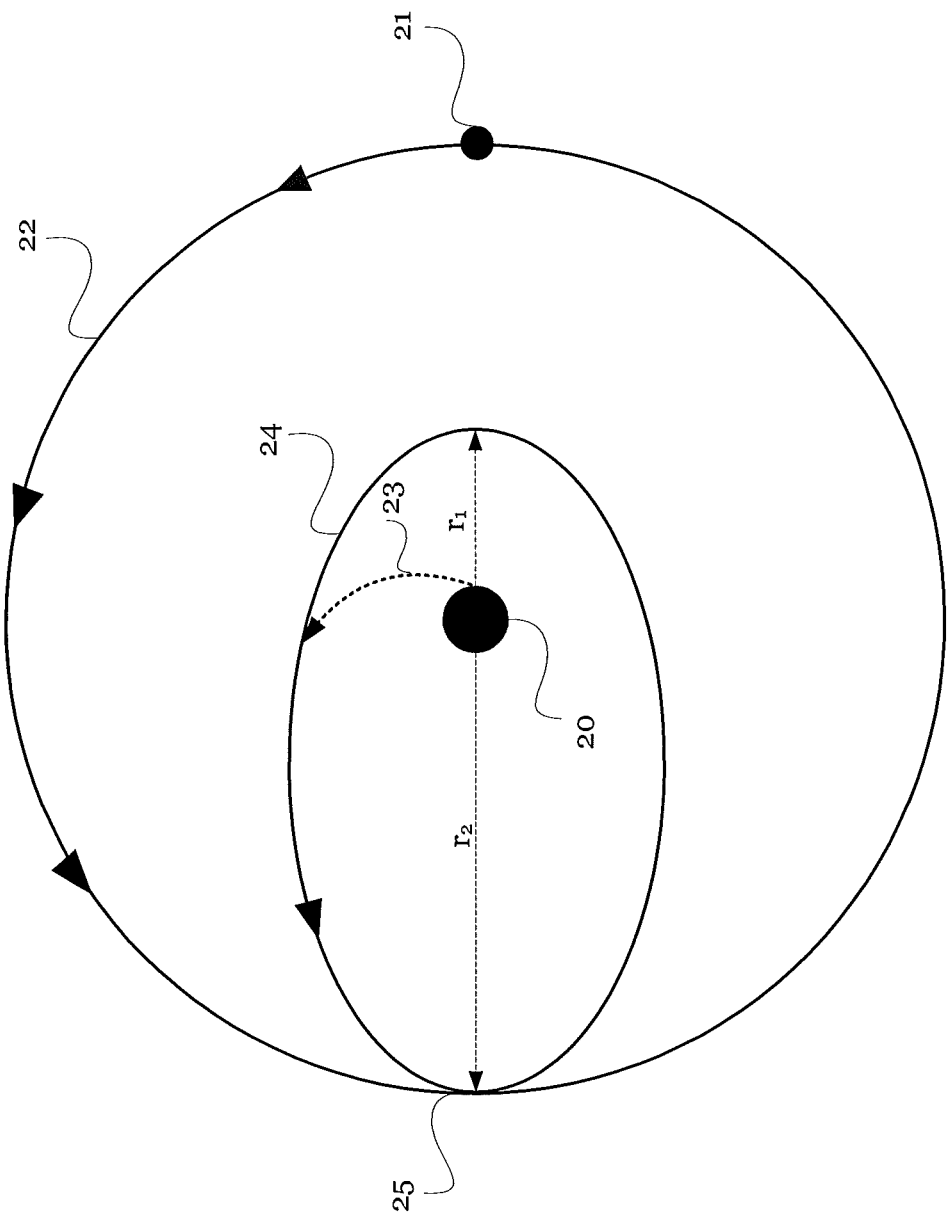
FIGS. 2a and 2b illustrate the first elliptical orbit of the vehicle, according to two embodiments of the present invention.
Figure 2B:
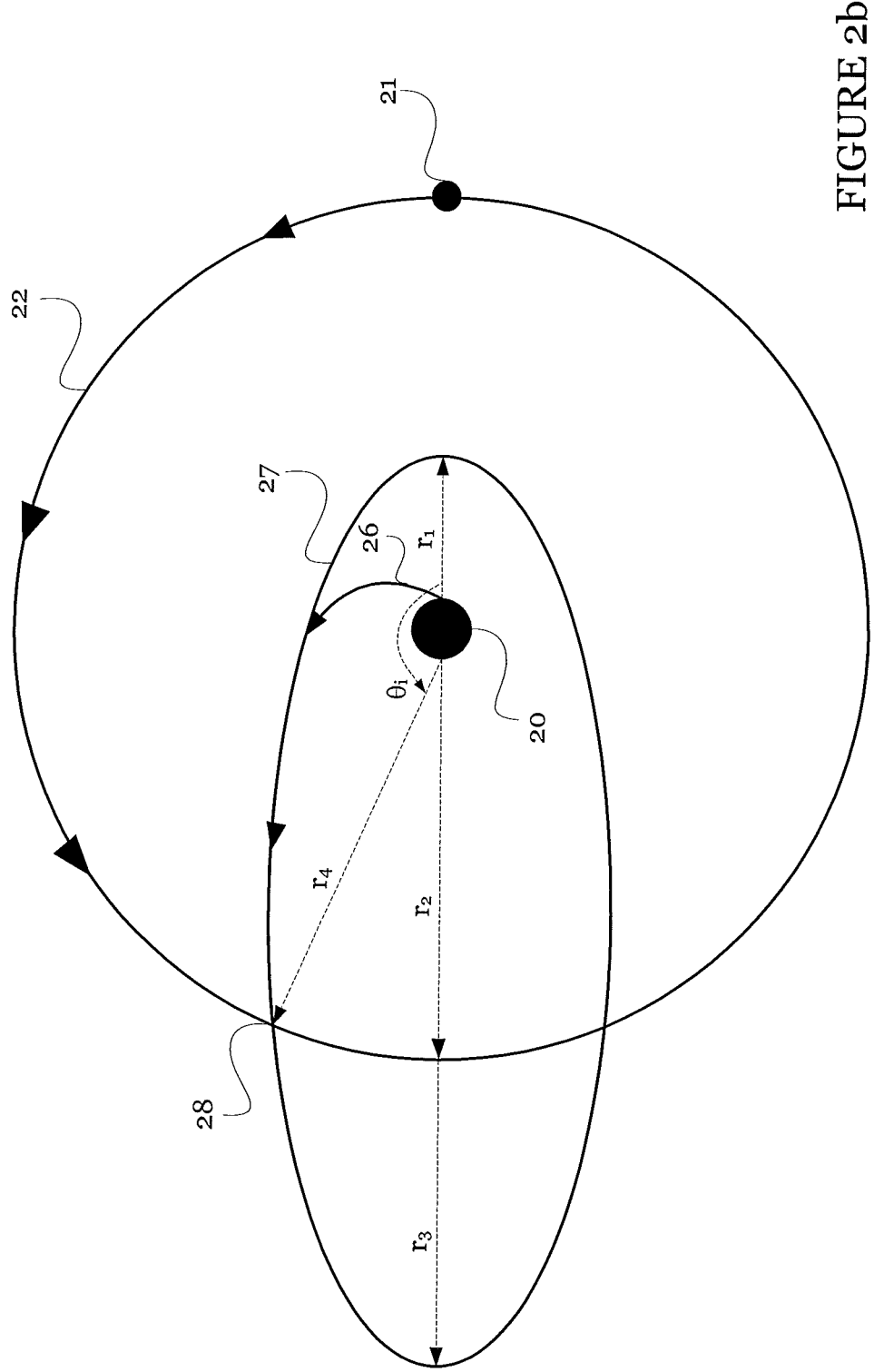

FIGS. 2a and 2b illustrates two examples of the first elliptical orbit of the vehicle, configured to enable interception of a target object, according to embodiments of the present invention. In both examples, the target object 21 is assumed to be in a Low Earth Orbit (LEO) have a substantially circular orbit 22 of radius $r_2$ about a body such as the Earth 20.

In FIG. 2a, the first elliptical orbit 24 is determined such that it tangentially meets the circular orbit 22 at the interception point 25, the interception point 25 lying on the major axis of the ellipse 24. An entire ellipse is shown in FIG. 2a as representing the orbit in which the vehicle would remain stable if it did not intercept the target object 21. A dotted line 23 shows a representative launch trajectory of the vehicle from Earth into the first elliptical orbit 24. The launch trajectory 23 is shown in simplified form and may in practice involve a plurality of complete orbits of the Earth 20 before its "destination orbit" (i.e. the first elliptical orbit) is reached.

The destination orbit is the first elliptical orbit 24 of the vehicle, an ellipse having a transverse diameter of $r_1+r_2$, where $r_2$ is the radius of the circular orbit of the target object. The ellipse is shown such that the Earth 20 is at a focus of the ellipse at distance $r_1$ from the circumference of the ellipse, and is at the focus furthest from the point 25 of intersection of the ellipse with the circular orbit 22 of the target object 21. The trajectory of the vehicle in the first elliptical orbit 24 can be defined in terms of polar co-ordinates expressed as functions of time, (r(t), θ(t)), where θ is measured as angle about the major axis of the ellipse in a direction pointing away from both foci of the ellipse, measured in an anticlockwise sense, and 'r' is a radius from the Earth 20.

As the target object 21 orbits the Earth 20 in an anti-clockwise direction, as shown in FIG. 2a, and as the vehicle travels anticlockwise along its first elliptical trajectory 24, the two orbits meet at the interception point 25, where the vehicle intercepts the target object. Since the target object 21 is travelling at a higher speed than the vehicle based on the altitudes of the respective orbits, the target object 21 is effectively approaching the vehicle shortly before interception.

In the embodiment of FIG. 2b, the first elliptical orbit 27 is determined such that it crosses the circular orbit 22 at the interception point 28, rather than tangentially meeting the circular orbit. As such, the first elliptical orbit 28 in this embodiment has a greater transverse diameter than that shown in FIG. 2a, and has a diameter of $r_1+r_2+r_3$, where $r_1$ and $r_2$ are as defined with respect to FIG. 2a, and $r_3$ represents the extension of the elliptical diameter beyond distance $r_2$. The vehicle travels in an anticlockwise direction around the first elliptical orbit 27, having launched along trajectory 26, at a varying distance from the Earth of $r_4$, and an angle of θ about the major axis of the ellipse. The trajectory of the vehicle in the first elliptical orbit can thus be defined as polar co-ordinates ($r_4$(t), θ(t)).

When $r_4=r_2$, and when $θ=θ_i$, the elliptical orbit crosses the circular orbit, and interception of the target object is performed.

In the embodiments described above, it is optimal for interception of the target object to occur when the vehicle has traveled along the first elliptical orbit from a position where θ=o to a position where $θ=θ_i$, and no further. In other words, the vehicle completes interception of the target object within one complete circumnavigation of the first elliptical orbit of the Earth. This scenario is optimal as it requires the shortest transit time for interception to be completed, and requires the fewest tracking routines and stabilisation manoeuvres (to be described in more detail below) in order for the trajectory of the vehicle to be maintained. For the arrangement shown in FIG. 2a, $θ_i=180°$.

There are, however, additional factors which must be taken into account in order to optimise the path of the first elliptical orbit, so as to ensure that interception occurs at the optimal location.

One of these factors is the approach velocity of the vehicle, relative to the target object. The relative velocity may be dependent on the relative sizes of the target object, and the nature of the interception routine, and can be optimised to as to ensure that the transition of the vehicle/target object composite to its second elliptical orbit occurs as smoothly as possible. Before the transition of the vehicle between first and second elliptical orbits is explained further, the interception routines are described in more detail below.

As shown in FIG. 1, the vehicle 10 contains an interception portion 13 which is specially designed to intercept a particular target object of space debris, and a number of different designs of the interception portion 13 are possible according to embodiments of the invention.

In one embodiment, the interception portion of the vehicle 30 is provided with a harpoon 32, as shown in FIG. 3a. The Figure illustrates both the stowed and deployed configurations of the harpoon 32. The harpoon 32 is intended to be fired at the target object 31, penetrate the target object 31, and bring it into the second elliptical orbit. Penetration is achieved through the use of a plurality of barbs 33 fitted to the harpoon, and the harpoon is tethered 34 to the interception portion. The launch of the harpoon 32 may be via a mechanical spring-based system, or make use of pressurised gas, with the specific configuration dependent on the required launch velocity and range. The launch velocity of the harpoon 32 is controlled dependent on the type of target object, and the degree of penetration which is required in order to secure engagement of the target object 31 with the harpoon 32. The launch velocity may be pre-programmed, in accordance with the pre-programmed trajectory of the vehicle 30, or may be determined on-the-fly using tracking sensors on-board the vehicle 30, to be described in greater detail below.

Having engaged the target object 31 with the harpoon 32, the tether 34 may remain fully extended so that the vehicle 30 tows the target object 31 during the deorbit routine, or may be contracted using a reel mechanism, so that the target object 31 is effectively retrieved and brought into close proximity with the vehicle 30. In either arrangement, the combination of the vehicle and the tethered target object is referred to hereinafter as a "composite body" or "unified body" which is associated with the second elliptical orbit, to be described in greater detail below. The term "composite body" also applies where other interception mechanisms are used.

As an alternative to a "linear" harpoon, in which penetration occurs in the direction of launch of the harpoon, three-dimensional penetration is achieved through the use of a grappling device 36 as shown in FIG. 3b. The grappling device 36 is placed in the path of the debris 31. The grappling device 36 largely operates in the same manner as the harpoon 32, but contains several small harpoons or barbs which may be activated either prior to, during or after launch of the harpoon so that they can penetrate an object 31 in multiple directions on interception. Alternatively the grappling device 36 could comprise a hook arrangement. This grappling device 36 is suitable where the target object 31 is of irregular shape, or contains a cluster of distributed smaller objects, all of which can be retrieved through a single harpooning action.

In another embodiment, air bags or nets 38 are used to capture a target object, as shown in FIG. 3c. Air bags are launched from the interception portion and the target object is cushioned and in some cases enveloped by the air bags to enable capture and/or retrieval. In other cases, having cushioned and stabilised the target object with an air bag 38, an auxiliary capture technique, such as the use of a harpoon 32 as above, can enable completion of the retrieval process. In other cases, the air bags 38 are not launched from the vehicle 37, but are simply inflated while attached to the vehicle. Engagement of the vehicle 37 with the target object is achieved through the target object effectively combining with the air bag 38 and vehicle 37 as a single body at the interception point.

The use of air bags 38 is appropriate where penetration of the target object with a harpoon might otherwise cause more damage to the target object, generating further space debris. In cases where engagement relies on the coincidence of the vehicle orbit with the orbit of the target object, the arrangement shown in FIG. 2a, where tangential coincidence of the orbits occurs, is particularly effective, as the relative difference in the directions of travel of the space object and the vehicle prior to engagement is at its minimum. A tethering arrangement might be more effective for the configuration of FIG. 2b, where there is greater directional difference between the vehicle and the target object prior to engagement.

The interception techniques described above are relatively passive in the sense that the physical interception means requires little active directional control in order to achieve interception. For example, the multi-directional engagement made possible through use of a grappling device or hook, and the directionally-insensitive air bag or net technique can perform effective capture of a target object which is spinning and travelling at high velocity without needing to consider the specific orientation of the target object at the exact moment of interception. For the harpoon 32 shown in FIG. 3a, which potentially has a more narrowly defined capture-zone than the grappling device 36 and the air bags 38, due to its more specific launch trajectory, accuracy may be improved by equipping the interception vehicle 30 with target-tracking means 39, which enable one or both of the orbit of the vehicle 30, and the harpoon launch point to be dynamically controlled in-flight. Such target-tracking means 39 are also shown in FIG. 3b and FIG. 3c, since this technique may also be used to further improve the use of a grappling device 36 or an air bag 38. The target-tracking means may use some of the communication means 15 which are described for use in communication with a ground station.

In one embodiment, for longer-range tracking, the tracking means can use infra-red sensors, or radar, configured so as to enable a three-dimensional plot of the motion of the target object, and its projected trajectory through space to be imaged. For shorter range tracking, one or more optical sensors may be sufficient, such as a stereoscopic camera. The tracking can be performed continuously, or to save power, can be based on periodic measurement, combined with appropriate interpolation algorithms.

In one embodiment, the output of the tracking means is fed to the controller onboard the interception portion, which performs processing of the received data, together with data defining the motion of the vehicle, to calculate the distance and time to the expected interception point. If the expected interception point differs from the interception point which was initially programmed, corrective action may be arranged by the controller.

The corrective action can be control of the attitude or orbit of the vehicle, achieved via actuation of one or more rocket thrusters positioned on the vehicle. The attitude can be changed by causing a rotational motion about one or more axes passing through the body of the vehicle, such as by arranging two rocket thrusters on opposite sides of the vehicle to be fired in opposite directions. The trajectory can be controlled by adjusting the velocity of the vehicle— increasing the velocity leads to a higher orbit which may lead to earlier interception of a target vehicle, whereas reducing the velocity might be applied in the case where the expected interception point is later than that originally programmed.

In another embodiment, the output of the tracking means is communicated to the ground station where the necessary processing and corrective control is determined and returned to a local actuation controller on the vehicle which in turn relays determined actuation signals to the rocket thrusters. Since the vehicle is intended for single use performance of control via communication with a ground station reduces the wastage of processing circuitry when the vehicle deorbits. In addition, the complexity, weight and cost of the vehicle are also reduced through performing processing at the ground station.

The corrective action can also be control of the launch of the harpoon in terms of the launch time, launch velocity, and launch direction, all of which can be calculated in order to ensure that the target object is engaged at the expected interception point. Again, the corrective action can be determined locally using on-board processing, or may be controlled via the ground station.

It will be appreciated that various combinations of the above-described corrective action may be applied where necessary, and that the corrective action may be applied where interception techniques are used which are not harpoon-based.

Movement of the attitude of the vehicle may be performed as part of the pre-determined control routine for the vehicle, rather than as a "corrective action". For example, the pre-determined interception programme may involve movement of the vehicle through the first elliptical orbit in a particular attitude optimised for the movement phase of the vehicle (for example, an attitude which facilitates corrective control and tracking, based on the position of the thrusters and the sensors on the vehicle body, or an attitude which is optimised for aerodynamic purposes during the launch phase), followed by movement to a different attitude close to the interception point which is optimised for ease of launch of a harpoon, for example. As an example, for a harpoon which is arranged in the interception portion so as to be forward-facing with respect to the travel direction of the vehicle, it may be more efficient to point the vehicle and the harpoon towards the target object at the point of launch of the harpoon then to launch the harpoon at an angle to the travel direction. In the example of FIG. 2b, for example, it will be appreciated that the vehicle may not be pointing towards the target object 21 before the interception point 28, as the direction of travel of the target object 21 and the vehicle are close to perpendicular, and so launch of a harpoon may be less efficient at this attitude. Instead, the vehicle may be rotated so that the harpoon-firing axis is oblique, or even perpendicularly arranged with respect to the direction of travel of the vehicle.

Although FIGS. 2a and 2b are shown so as to illustrate the first elliptical orbit of the vehicle as a whole, it will be appreciated, based on the description of the interception portion above, that the body of the vehicle and the interception point do not necessarily need to be exactly coincident in order for interception of the target object to be achieved. For example, where a harpoon system is used, the interception point can represent the coincidence of the harpoon with the target object, with the vehicle positioned slightly outside the orbit shown to avoid collision with the target object with the body. The difference between the position of the vehicle and the interception point would thus be dependent on the length of the tether, and the launch velocity of the harpoon can be selected so as to take into account a particular range and target object size. As such, the orbits shown in FIGS. 2a and 2b are to be interpreted as representative orbits of a combination of the vehicle and the interception means, the skilled person being able to appreciate, for a given embodiment, the degree of variation from the trajectory which is permissible to achieve engagement.

In the embodiments described above, the relative closing velocity of the vehicle and the target object is typically configured to be of the order of 100-200 m/s. The interception point is typically at an altitude of the order of 800 km. Launch, capture and deorbit typically takes a total of around 1 hour.

A relative velocity of the order of 100-200 m/s is also what is required in many cases for penetration of the harpoon into the target object. As such, for a relative closing velocity of 150 m/s, for example, the launch velocity of the harpoon relative to the vehicle may be of the order of only 10 m/s (enough to separate the harpoon away from the interceptor vehicle), given the initial velocity of the harpoon relative to the target object (so the total velocity relative to the target would be 160 m/s). Such a low launch velocity simplifies the launching mechanism, and enables implementation in a number of different forms. In view of the requirement for the vehicle of embodiments of the present invention to be as simple as possible due to its intended "one-shot" use, mechanical launching mechanisms may therefore be preferred as cheaper, lighter, and easier to implement than more complex hydraulic or pressurised systems.

The use of an elliptical orbit for the vehicle means that the composite of the interceptor vehicle and the debris target has a resulting orbital velocity lower than the original debris target, and that the composite will enter an elliptical orbit without the need for additional expenditure of propellant. The resulting ellipse will have the same apogee as the interception point, but a substantially lower perigee. Thus an overall change in the debris orbit is achieved with in an efficient way, minimizing the mass of propellant needed.

Figure 4:
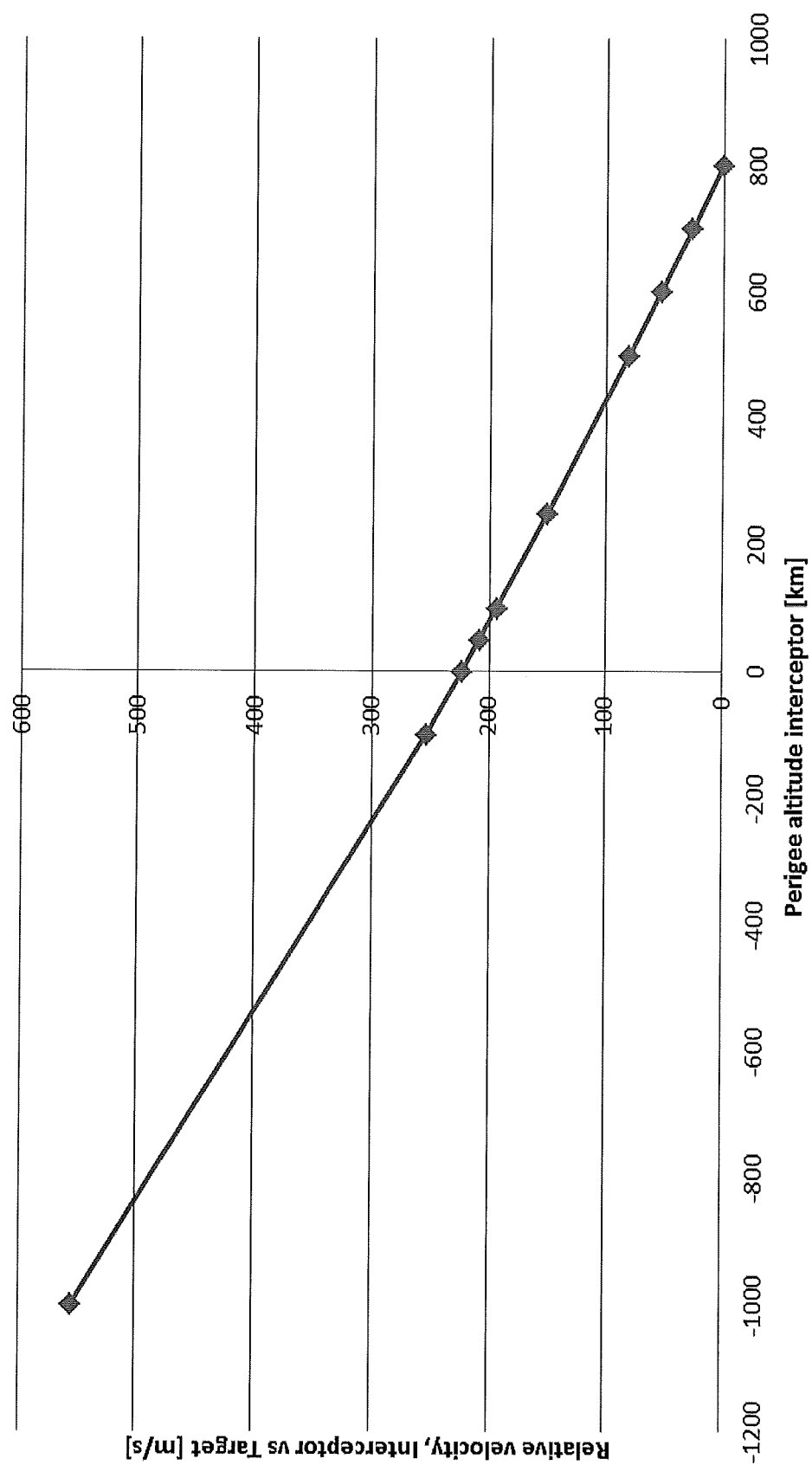
FIG. 4 is a graph illustrating the effect of orbit altitude on the required relative closing velocity between the interception vehicle and the target object.

FIG. 4 shows the relative velocity between the interceptor vehicle and the target as a function of the interceptor vehicle's perigee altitude (assuming an apogee equal to the target at 800 km). As the interceptor perigee is lowered the relative velocity increases but the resulting composite perigee also decreases.

Once the vehicle has engaged with the target object, the composite body enters a second elliptical orbit, such that deorbit takes place and the composite body burns up in the Earth's atmosphere. If the composite body has a mass of the order of 1 tonne or less, the body will burn completely in the Earth's atmosphere. For greater masses, there is the possibility that portions of the composite body will return to Earth. As such, the deorbit trajectory should be selected for larger objects such that any debris returning to Earth does so in a safe area, such as a remote area of an ocean.

In an embodiment of the present invention, the composite body moves to a lower orbit than that of the first elliptical orbit after engagement between the vehicle and the target object simply on account of the principle of conservation of momentum. In other words, the increase in the mass of the composite body relative to the vehicle before engagement with the target object causes a reduction in its linear velocity, and consequently, a change in its orbit, such that angular momentum is conserved.

Where the deborbit trajectory is defined purely by the conservation of momentum, the result is a second elliptical orbit of greater conjugate diameter than the first elliptical orbit. Based on the principle of the conservation of momentum, the specific nature of the ellipse depends on the relative masses of the target object and the vehicle. Where the interceptor vehicle is substantially heavier than the target object, the ellipse is closer to the first elliptical orbit than the circular orbit of the target object as shown in Figure xa. Where the interceptor vehicle is substantially lighter than the target object, the ellipse is closer to a circular obit than the first elliptical orbit as shown in Figure xb. The eccentricity of the ellipse is thus effectively derived from a weighted combination of the circular orbit and the eccentricity of the first elliptical orbit, the weights dependent on the mass of the target object and vehicle respectively.

The mass of the target object can be determined in the initial configuration phase of the mission, based on information about the size and density of the object and its trajectory, and/or information relating to a similar target object on Earth. For example, if the object were a discarded fuel tank, such an object could be compared with manufacturer's data for the fuel tank, and its size and mass determined accordingly. If the target object is unknown, such as a fragment of a larger object, then the mass would need to be determined purely from data relating to its orbit, such as its linear velocity and orbit radius.

With a second elliptical orbit defined in this manner, deorbit of the target object can be achieved with minimum propellant, since it is the trajectory of the vehicle which enables the interception and deorbit routine, rather than complex and expensive manoeuvres required in conventional systems.

In another embodiment of the present invention, the second elliptical orbit is defined in advance of the mission with respect to the expected interception point and a destination location in the Earth's atmosphere, over a remote area of the Pacific Ocean, for example. The composite body is controlled so as to achieve the second elliptical orbit by motion control actuators on the interception portion of the vehicle. These actuators can be the same rocket thrusters as those present on the vehicle to aid with control and stabilisation of the vehicle during its first elliptical orbit. Since this embodiment does not rely exclusively on the principle of conservation of momentum in order for the second elliptical orbit to be achieved, the motion control can be thought of as a "corrective action" with respect to the momentum derived orbit.

Where the first and second elliptical orbits are defined in advance, the orbits are optimised so that as small a correction action as possible is required in order to reach the second elliptical orbit. In one embodiment, the required optimisation can be applied firstly to the position of the interception point, such that it lies on both a first elliptical orbit for interception and a second elliptical orbit for deorbit where the smallest possible corrective action would be required for transition between the first and second elliptical orbits.

In an example where the target object is substantially lighter than the vehicle, it can be appreciated that the second elliptical orbit might be similar to the first elliptical orbit, and so the first elliptical orbit can be defined such that deorbit through the second elliptical orbit occurs in the desired area of the Earth's atmosphere without significant corrective action taking place between the first and second elliptical orbits.

The same principle would also apply to cases where the target object is substantially heavier than the vehicle, but the minimum amount of corrective action which could be used would be greater.

As in the first elliptical orbit, corrective motion can be applied to the composite body based on calculations performed at a ground station. Whereas in the launch phase, corrective motion is generally to achieve a change in position based on real-time observations of a target and the progress of the vehicle, the initial trajectory and velocity, having been predetermined at the moment of launch, the corrective motion in the second phase is typically used both to achieve a change in position, and a change in velocity, so that the second elliptical orbit can be entered and subsequently maintained. In order to bring the composite body down to the Earth's atmosphere, the change in velocity is typically a reduction, or retardation, achieved by firing a thruster in the opposite direction to the direction of travel. Although such a braking manoeuvre requires fuel consumption, the required consumption is relatively low, and is reduced by the braking effect caused by the mass of the target object.

Figure 5:
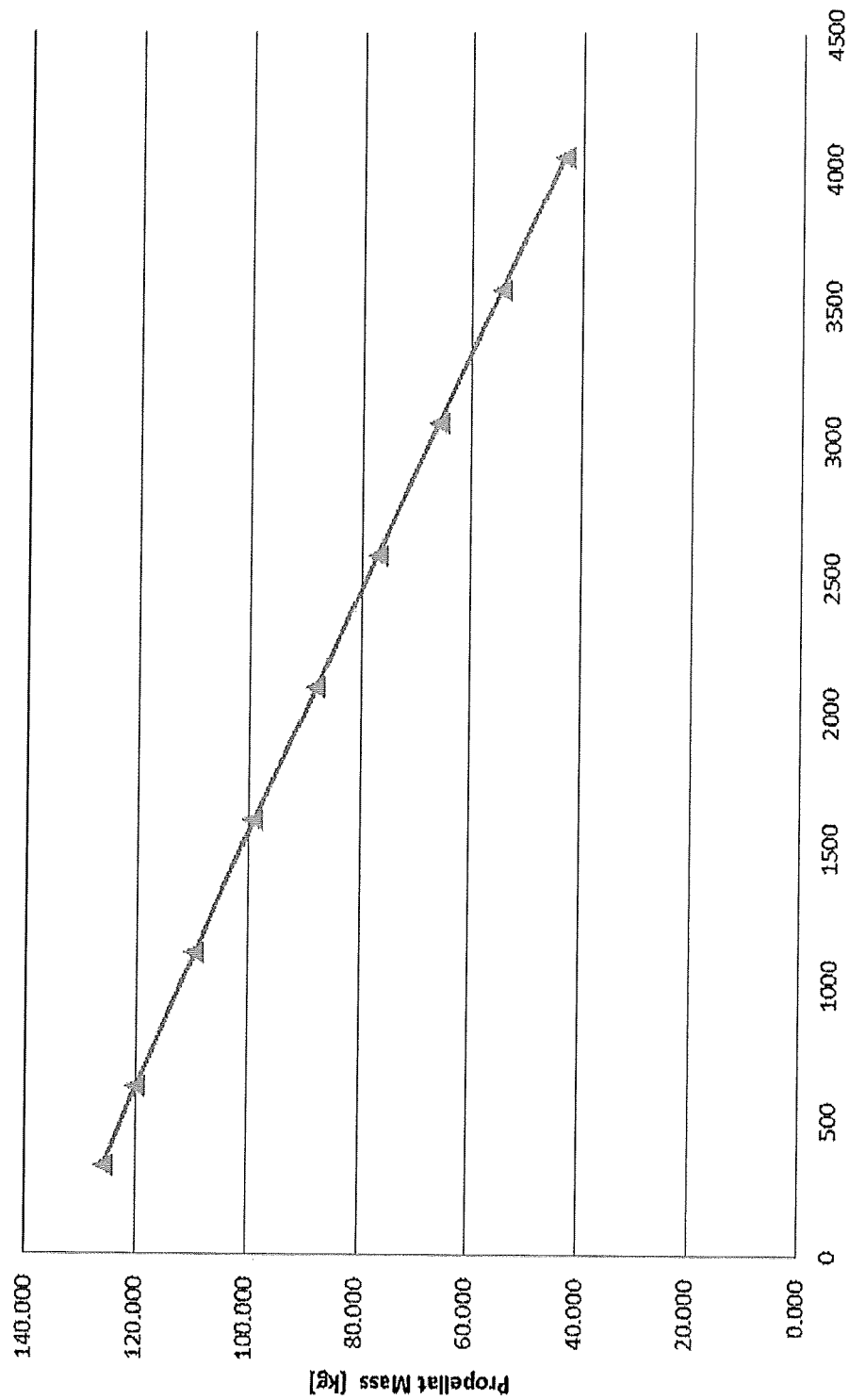
FIG. 5 illustrates the required fuel for a braking manoeuvre after capture of a target object, according to an embodiment of the present invention.

FIG. 5 illustrates the required fuel for a braking manoeuvre after capture, for a target of 2 tonnes, and a chase vehicle of mass between 500 and 4,000 kg. The fuel consumption decreases linearly from over 130 kg to a relatively modest 40 kg. The decrease in fuel consumption reflects the increasing effect of the first elliptical orbit of the chase vehicle on the deorbit manoeuvre. Where the chaser has low mass relative to the target, the target's initial orbit is a dominant component of the composite orbit, and so more fuel is required by the chaser to change the composite orbit into a deorbit manoeuvre. Where the chaser has high relative mass, the chaser's momentum is a dominant component of the composite orbit, and so fuel can be saved through an appropriate selection of the first elliptical orbit of the chase vehicle such that minimum manoeuvring is required to bring about deorbit.

In an embodiment employing a braking thruster, the thruster is activated as soon as possible following interception of the target so that the second elliptical orbit is adopted as soon as possible.

Figure 6:
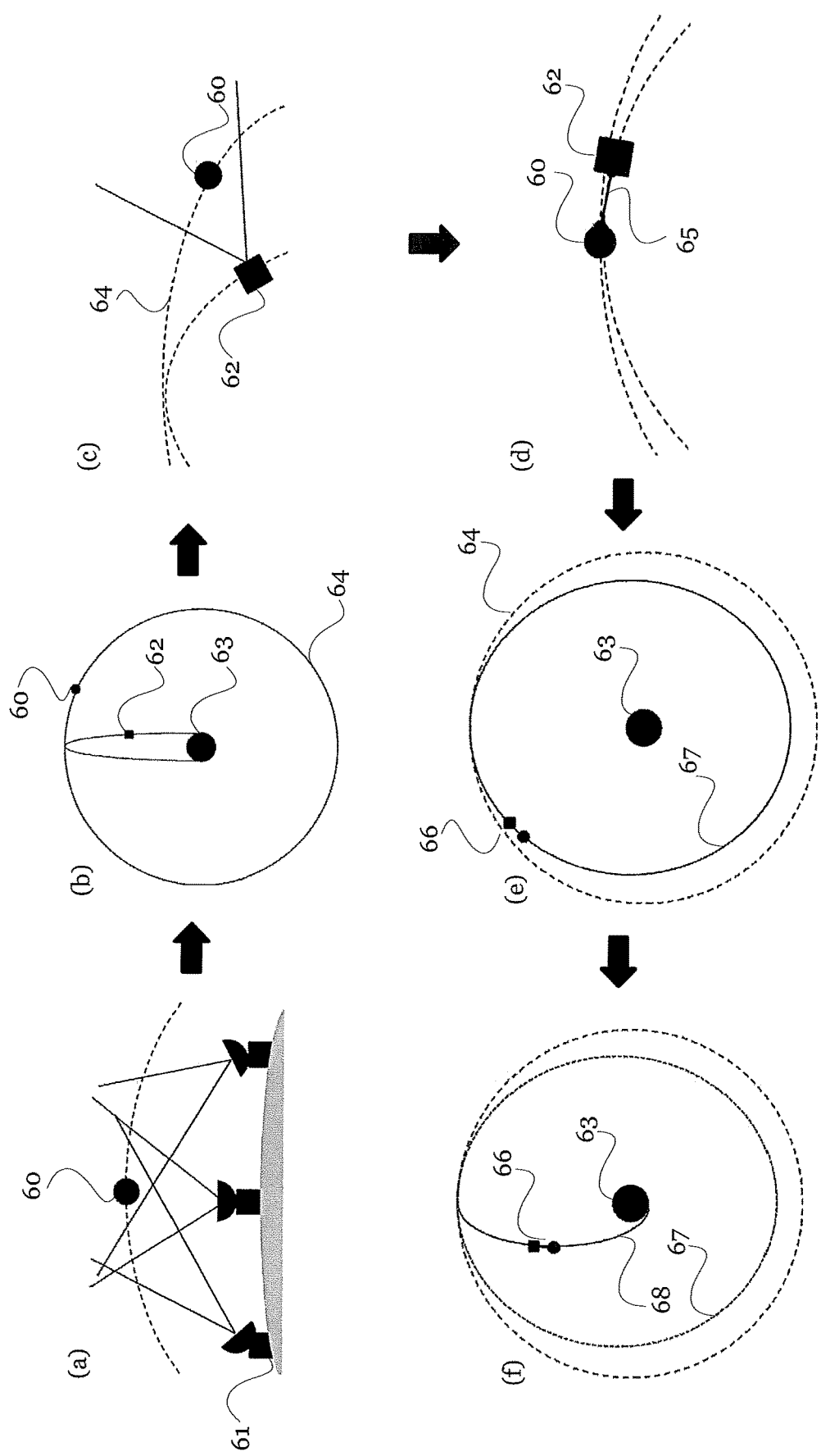
FIG. 6 illustrates an interception and orbit routine according to an embodiment of the present invention.

FIG. 6 illustrates the completed sequence. FIG. 6a illustrates the acquisition of orbit parameters and the attitude of the target 60 from radar and communications technology 61 on the ground, but space-based satellites may also be used. FIG. 6b illustrates the launch of the chaser 62 from Earth 63 into a ballistic trajectory to intercept the target 60, which is initially travelling in orbit 64. The ballistic trajectory represents the first elliptical orbit described above. FIG. 6c illustrates the chaser 62 tracking the target 60, and performing any manoeuvres required to allow interception. FIG. 6d illustrates the establishment of a flexible or rigid link 65 being formed between the interception portion of the chaser 62 and the target 60. FIG. 6e illustrates the new elliptical orbit which would be adopted by the unified interceptor and target composite 66 after interception in an example where the new orbit 67 is defined only bt the principles of conservation of momentum. The orbit is closer to the Earth than the initial orbit 64 of the target due to the increased mass of the composite. Such an orbit will not allow deorbit in the Earth's atmosphere, however, and so if this is required, manoeuvres are performed to bring the orbit into the Earth's atmosphere, as shown in FIG. 6f. The deorbit trajectory 68 represents the second elliptical orbit described above.

In the example shown, the interception and deorbit of the target object is achieved within a single orbit of the Earth. As such, the vehicle can be thought of as a missile which is engages with a target and brings it into the Earth's atmosphere within a single controlled trajectory comprised of two temporally consecutive portions. The vehicle is thus a "one-shot" vehicle which is suitable for a single deorbit routine before burning up with the space debris. Through manufacturing a series of interception vehicles, a number of different objects can be retrieved, and the deorbit of the vehicles ensures that they themselves do not contribute to the space debris problem.

Figure 7:
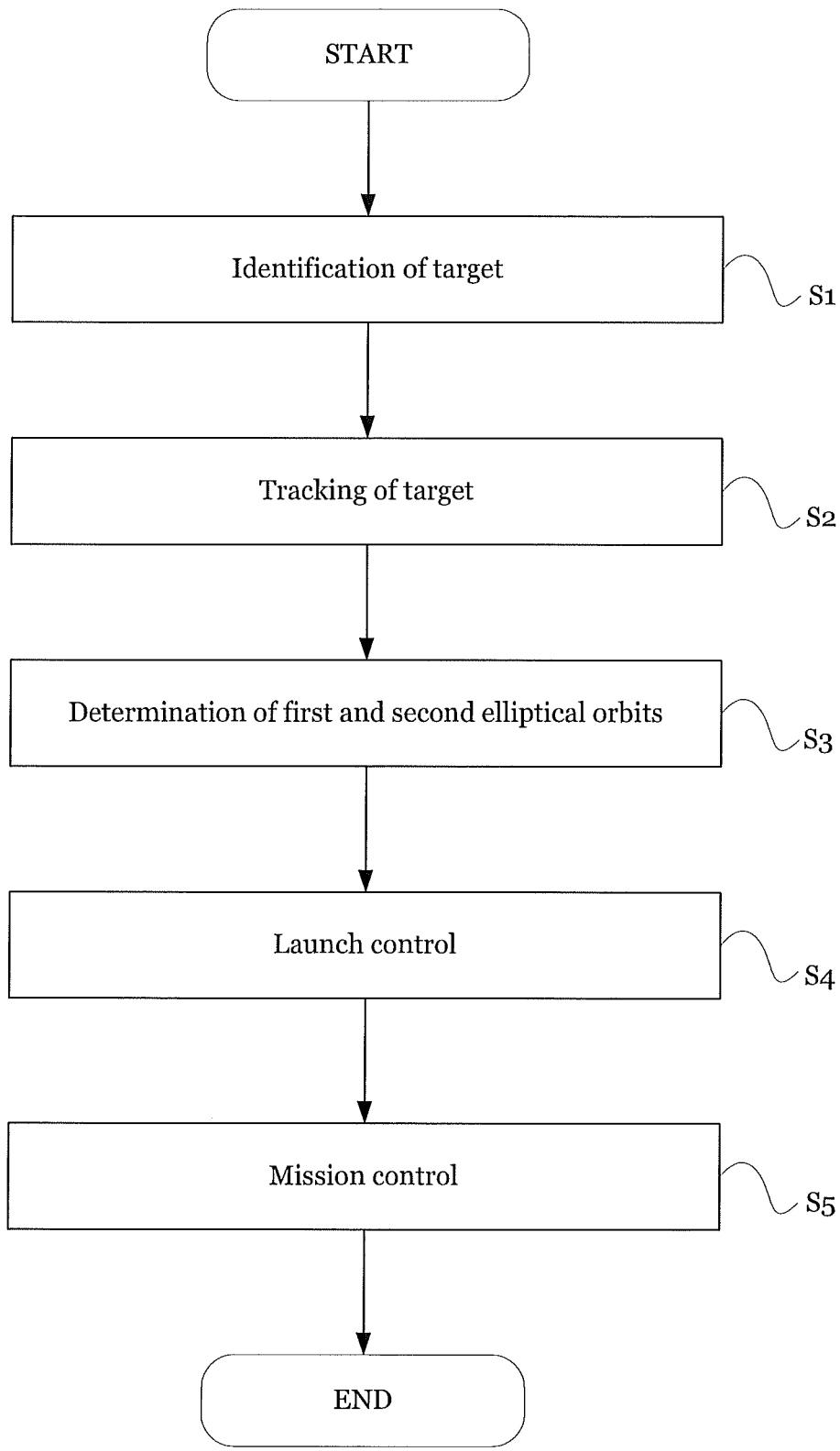
FIG. 7 illustrates a flow chart showing a control method performed according to an embodiment of the present invention.

FIG. 7 illustrates a flow chart showing the steps of a control method used in the present invention. The control method is implemented from a ground station.

Step S1 is the identification of a target object to be retrieved. This is achieved by selection of an object from space images obtained through radar, telescopic observation and so on. The object may be of a size or shape matching a predetermined size or shape known to represent space debris, for example. The size and shape of a discarded fuel tank, for example, might be predetermined, so that such objects can be identified using pattern recognition algorithms performed on the space images. Alternatively, an object may be identified manually from the images.

Depending on the target object to be selected, information about the target object may be known in advance, where the mission is to intercept a certain type of object. Other target objects may be previously unknown and identified only through observation—in such cases, information about the target object must be determined through processing the images themselves, for example through observation of the object's size, its velocity, its orbit, angular momentum, density and so on.

Having identified the target object, step S2 is the subsequent tracking of the target object, which is required in order for step S3, the determination of the first and second elliptical orbits of the interception vehicle to be performed. Tracking is performed using any conventional technique such as radar or optical observation. The result of the tracking is a plot of the trajectory of the target object through space.

In step S3, the first and second elliptical orbits of the interception vehicle are calculated. The calculation is based on the identification of a position at which interception of the target object is to occur, and the position at which deorbit is to occur. This may be predetermined, such as a location over the Pacific Ocean, where any return of space debris to Earth will not be harmful. In addition, the calculation is based on the launch location of the interception vehicle, and its possible launch trajectories.

The nature of the interception is first determined, based on the design of the interception portion and the engaging means, and whether interception is to take place using an interception of the type shown in FIG. 2a or FIG. 2b. From this it can be determined how close the interception vehicle needs to travel with respect to the interception point, and what sort of deorbit routine is required, such as towing of the target object, or combination of the target object with the vehicle.

The transition between the first and second elliptical orbits is calculated by taking into account the mass of the interception vehicle and the mass of the target object, determined in advance in step S1. The relative mass leads to a determination as to the change in eccentricity of ellipse which could be expected to occur when transitioning from the first orbit to the second orbit, as set out above, when also taking into account the orbit of the target object.

The first and second elliptical orbits are optimised in a manner which enables a transition from the first to the second orbit to occur with the minimum amount of corrective motion as possible. In order to make this calculation, the trajectory of the interception vehicle should be as smooth as possible between the first and second zones, in other words, the rate of change with respect to time, of the trajectory should be minimised across the boundary between the first and second trajectories.

Figure 8B:
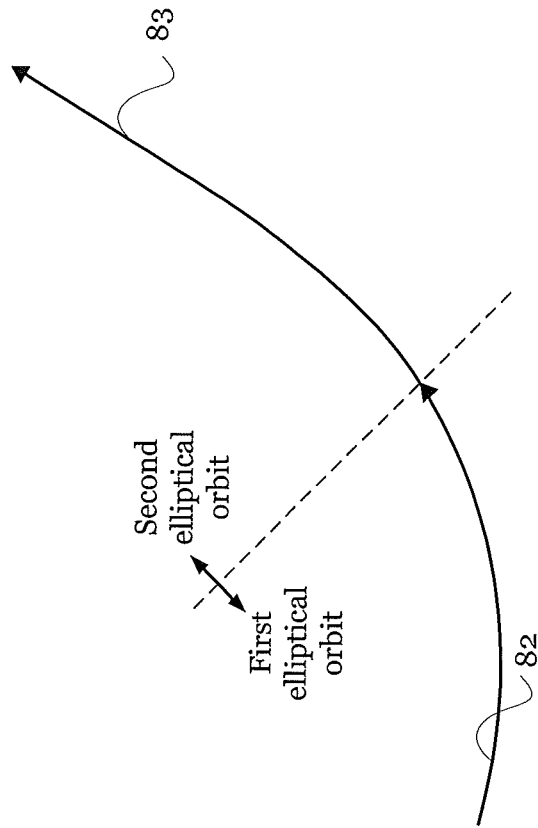
FIGS. 8a and 8b represent examples of the transition between two elliptical orbits.
Figure 8A:
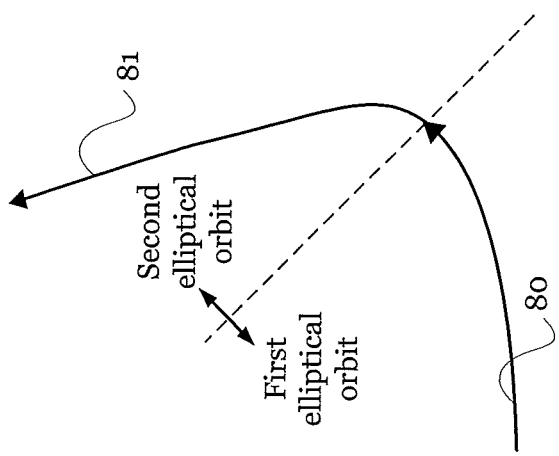

FIG. 8a shows an example of first 80 and second 81 elliptical orbits exhibiting a high rate of change of trajectory at the transition point represented by the dotted line, while FIG. 8b shows an example of first 82 and second 83 elliptical orbits which exhibit a much more continuous trajectory—the orbits are calculated such that the configuration closer to that of FIG. 8b than FIG. 8a is obtained.

Such a configuration is obtained based on simultaneous equations defining the relationship between the launch trajectory of the orbit and the interception point, the positions of the interception point and deorbit, and the relative masses of the interception vehicle and the target object, i.e. the relative eccentricity of the first and second elliptical orbit. The simultaneous equations are written in terms of parameters expressing trajectories expressed in polar co-ordinates, namely a radius $r(t)$, and an angle $\theta(t)$ expressed as functions of time with respect to a particular origin (such as a focus of an ellipse) and radial direction.

The optimised solution of the simultaneous equations leads to a set of the first and second elliptical orbits, which are programmed as itineraries into the memory of the interception vehicle to enable maintenance of these orbits when the vehicle is in space.

Step S4 involves the control of the launch of the space vehicle. This has two aspects—the control of the launch trajectory, and the timing of the launch. The control of each is similar to a missile launch in the sense that the trajectory and timing are defined so as to engage with a particular target at a particular time, given that the intended first elliptical orbit is known, and the movement of the target object is known. As such, the launch of the vehicle can be controlled in a relatively conventional manner, such that transition of the interception vehicle from the launch trajectory to the first elliptical orbit, movement of the vehicle through the first elliptical orbit to the interception point, and interception of the target object occur in a predefined manner.

Having launched the space vehicle, the remaining activities performed from the ground station relate to the continued processing of tracking of both the target object and the interception vehicle. Such activities take a variety of forms, and are generalised in this description as a "mission control" step S5 in the flow chart of FIG. 7.

The tracking is such that corrective action can be controlled where the interception vehicle has deviated from a particular orbit, as described above. The vehicle itself can perform tracking of the target object and can relay the tracking information to the ground station for processing. As part of the processing, control of the activation of an engagement means, such as a harpoon, can be controlled to ensure interception occurs at the correct place.

In addition, control of separation of the launching stages can be performed from the ground station, such that only an interception section remains once the vehicle is in the first elliptical orbit. Finally, tracking of the composite object formed of the interception section and the intercepted target object can be performed in order to ensure that deorbit occurs safely.

It will be appreciated that modifications to the embodiments described above may be made above which fall within the scope of the invention as defined by the claims, based on interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present invention, an embodiment showing a singular component should not preclude other embodiments including a plurality of the same component, and vice-versa, unless explicitly stated otherwise herein. Further, the present invention encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are intended to be encompassed by the claims.

The invention claimed is:

1. A vehicle for intercepting a target object orbiting in space, comprising:
    an interception portion for intercepting a target object when the vehicle is in orbit, wherein the interception portion comprises a means for engaging with the target object when the vehicle is at an interception point; and
    a launching portion arranged to launch the vehicle from Earth into a first elliptical orbit which intersects an orbit of the target object at the interception point, the vehicle being arranged to adopt a second elliptical orbit on engagement with the target object, wherein the second elliptical orbit is determined prior to launch;
    wherein in which the first elliptical orbit is arranged so as to intersect the orbit of the target object at an interception point, and
    wherein the second elliptical orbit is such that the vehicle is arranged to move from the interception point towards the Earth's atmosphere when engaged with the target object.

2. The vehicle according to claim 1, wherein the interception portion comprises:
    a means for tracking the target object, the tracking means comprising one or more of an optical sensor, an infrared sensor, and radar.

3. The vehicle according to claim 2, further comprising:
    a means for controlling movement of the vehicle in the first or second elliptical orbits.

4. The vehicle according to claim 3, wherein the means for controlling movement of the vehicle is arranged to receive feedback from the tracking means and to impart corrective motion to the vehicle.

5. The vehicle according to claim 3, wherein the means for controlling movement of the vehicle comprises one or more thrusters controlled by a control means associated with the interception portion.

6. The vehicle according to claim 3, wherein the first and second elliptical orbits are such that a transition from the first elliptical orbit to the second elliptical orbit utilizes minimum operation of the means for controlling movement of the vehicle.

7. The vehicle according to claim 1, wherein trajectories of the first and second elliptical orbits are predetermined and stored in a memory associated with the vehicle.

8. The vehicle according to claim 1, wherein the interception portion comprises a controller configured to calculate the second elliptical orbit based on information relating to the target object.

9. The vehicle according to claim 1, further comprising:
    a communication means for communicating with a ground station to receive trajectory information defining the first and second elliptical orbits.

10. The vehicle according to claim 1, wherein the engaging means comprises at least one of a harpoon, a grappling device or hook, a net, and one or more airbags.

11. The vehicle according to claim 10, wherein the engagement means is arranged to cause the interception portion to combine with the target to form a composite body.

12. The vehicle according to claim 10, wherein the engagement means is arranged to cause the interception portion to combine with the target object to tow the target object in the second elliptical orbit.

13. The vehicle according to claim 1, further comprising:
    a retardation means for slowing the vehicle from the first elliptical orbit to the second elliptical orbit on or after engaging the target object,
    wherein the second elliptical orbit is a lower orbit than the first elliptical orbit.

14. A method of controlling a vehicle for intercepting a target object orbiting in space, comprising:
    controlling the vehicle to cause the vehicle to be launched from Earth into a first elliptical orbit to intersect an orbit of the target object at an interception point; and
    controlling the vehicle to cause the vehicle to engage with the target object at the interception point and to adopt a second elliptical orbit on engagement with the target object,
    wherein the second elliptical orbit is such that the vehicle is arranged to move from the interception point towards the Earth's atmosphere when engaged with the target object, and is determined prior to launch.

15. The method according to claim 14, further comprising:
    tracking the target object to determine a closing velocity of the vehicle with respect to the target object at the interception point,
    wherein the closing velocity of the vehicle enables engagement of the vehicle with the target object and a transition from the first elliptical orbit to the second elliptical orbit utilizing minimum corrective control over the movement of the vehicle.

16. The method according to claim 14, further comprising:
    tracking the vehicle when engaged with the target object; and
    controlling the second elliptical orbit such that the vehicle enters the Earth's atmosphere at a predetermined location.

17. The method according to claim 14, wherein trajectories of the first and second elliptical orbits are predetermined and stored in a memory associated with the vehicle.

18. The method according to claim 14, further comprising:
 calculating the second elliptical orbit based on information relating to the target object.

19. The method according to claim 14, further comprising:
 communicating with a ground station to receive trajectory information defining the first and second elliptical orbits.

20. The method according to claim 14, further comprising:
 slowing the vehicle from the first elliptical orbit to the second elliptical orbit on or after engaging the target object,
 wherein the second elliptical orbit is a lower orbit than the first elliptical orbit.

\* \* \* \* \*